FLUID MEMORY DEVICE

Filed June 29, 1964

INVENTOR
MARVIN JACOBY

BY Thomas P. Murphy
AGENT

United States Patent Office 3,282,503

Patented Nov. 1, 1966

3,282,503

FLUID MEMORY DEVICE

Marvin Jacoby, Fort Washington, Pa., assignor to Sperry Rand Corporation, New York, N.Y., a corporation of Delaware Filed June 29, 1964, Ser. No. 378,794
9 Claims. (Cl. 235—201)

This invention relates to a memory device and more particularly to a fluid memory and read-out device.

Recently there has occurred a rapid advancement in the pure fluid amplifier art. From an experimental fluid element analogous to the electronic amplifier, there has developed a pure fluid counterpart for nearly every known electronic element used in logic or controlled circuitry. For example, the pure fluid amplifier art now includes amplifiers, inverters, OR gates, NOR gates and AND circuits. In addition, fluid circuitry has been designed, built and successfully operated employing over one hundred of these fluid elements. Not only is this type of circuitry much easier, simpler and more economical to construct as compared to the equivalent electronic circuitry, but also it promises to be more reliable in operation. Furthermore, fluid circuitry can be used under widely varying environmental conditions. Due to these obvious advantages of circuitry employing fluid elements over that employing electronic elements, more complex fluid circuitry for performing logic and control functions is now being built or planned in many cases.

However, a major obstacle in the way of the development of larger and more complex logic circuitry employing fluid elements has been the speed and size of available fluid memory elements.

The great bulk of presently available fluid memories utilize fluid flip-flops. The disadvantages of these which deter their use in fluid memories lie in their large size, high cost and high power requirements. Furthermore, they are volatile i.e., power must continually be applied to preserve the contents of their memories.

Another fluid memory in present use is the fluid delay line memory wherein fluid pulses are introduced into one end of a coiled tubing and emerge at the far end. These pulses are then amplified, reshaped, retimed and reintroduced to the front of the delay line. One disadvantage of this type of fluid memory is its long latency time of operation.

The major disadvantage of the two memory devices discussed above is their low storage capacity in relation to size of the memory device. In other words, the ratio of bit storage capacity to size of the memory device is extremely low. Therefore, the use of either the flip-flop memory or the delay-line memory is impractical in systems requiring more than a few words of storage. Thus, it became apparent that a memory device employing a concept that would provide for low cost, low power consumption and high memory density would be required if fluid circuitry of a complexity comparable to memory requiring electronic logic circuitry were to be achieved.

The present invention provides such a fluid memory. The present invention contemplates a fluid memory in which all of the above pointed out disadvantages are eliminated and which provides a non-volatile, large capacity, low cost, random access fluid memory capable of operating at speeds comparable to the fluid elements themselves.

Therefore, it is an object of the present invention to provide a fluid memory element which is small in size and which is high in speed of operation.

Another object of the present invention is to provide a fluid memory element which is simple and inexpensive to construct.

A further object of the present invention is to provide a fluid memory which has a large storage capacity, which utilizes a small amount of power, and wherein a power loss will not result in destruction of the memory.

A still further object of the present invention is to provide a fluid memory matrix which has a large storage capacity relative to its size and which operates at speeds comparable to the other fluid elements available in the art.

Yet another object of the present invention is to provide a fluid memory matrix capable of providing a nondestructive, high density memory which is small in size, low in power consumption and which has a speed of operation comparable to the fluid elements available in the art.

Other objects and many of the attendant advantages of the fluid memory element and fluid memory matrix of the present invention will become apparent upon reading of the following description in conjunction with the drawing wherein.

Figure 1:
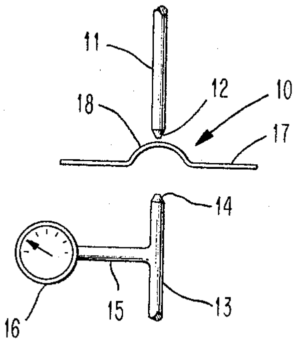
FIGURE 1 illustrates a preferred embodiment of the fluid memory element of the present invention.
Figure 2:
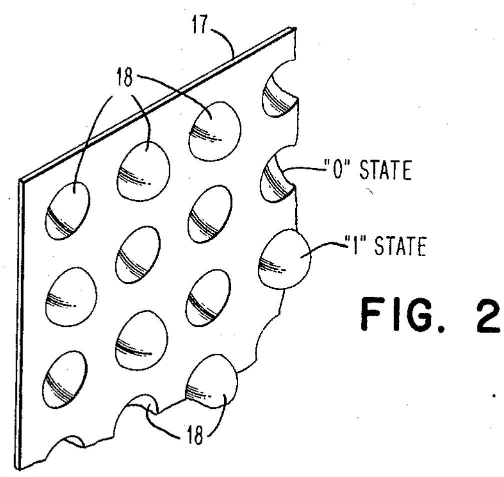
FIGURE 2 shows a dimpled sheet storage element used in conjunction with the present invention.

Referring now more particularly to FIGURE 1 there is shown the basic fluid memory element of the present invention. The fluid memory 10 comprises a write tube 11 having an orifice 12. A sense tube 13 having an orifice 14 is disposed relative to the tube 11 such that the orifice 14 of the tube 13 is directly opposite the orifice 12 of the tube 11. A pressure reading device such as manometer 16 is connected to the tube 13 by a tube 15. Each of the tubes 11 and 13 may be connected to sources of fluid power (not shown). A thin sheet 17 of plastic or metal, more readily seen by reference to FIGURE 2, is disposed between the orifices 12 and 14 such that it is perpendicular to the sheet of drawing.

As shown in FIGURE 1 the sheet 17 has a dimple 18 formed therein as by pressing, stamping or in any other convenient manner. The dimple 18 is so disposed between the orifices 12 and 14 that when fluid such as air of sufficient volume and pressure is passed through the tube 11, the dimple is caused to snap out in the direction opposite to that shown in FIGURE 1 by the action of the air pressure from the orifice 12. In the same manner, if air of sufficient volume and pressure is passed through the tube 13, the dimple 18 is caused to snap back to the position shown in FIGURE 1. Due to the fact that no forces other than air act on the dimple 18, the dimple 18 always remains in its last state in the absence of air of the proper pressure passing out of the orifices 12 or 14.

Figure 4:
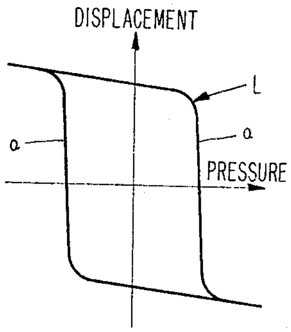
FIGURE 4 represents the pressure-displacement curve of the dimples.

The pressure-displacement characteristics of the dimples are analogous to square-loop B-H characteristics of magnetic cores. Referring to FIG. 4, which represents the pressure-displacement curve of the dimple, it may be seen that the switching of a dimple from one state to another is abrupt. This is shown by sides *a* of the hysteresis loop L. At the same time it may be seen that switching of the dimple from one state to another occurs only when the pressure has a predetermined value.

When the dimple 18 is in the position shown, it is said to be in the "0" state. When air pressure from the tube 11 causes the dimple 18 to snap to its other position, it is said to be in the "1" state. By use of a pressure sensitive device such as the manometer 16 attached to the tube 13 the particular state "0" or "1" of the dimple 18 may be detected or read-out. When the dimple 18 is in the "1" state, that is in the position opposite that shown in FIGURE 1, and air is passed through the tube 13 which is not sufficient to snap the dimple 18, its output at orifice 14 is greatly restricted. Thus, the fluid in the tube 15 increases and manometer 16 reads high. However, when the dimple 18 is in the position shown, its output at orifice 14 is not so restricted and the manometer 16 reads low. Thus, the manometer 16 visually informs an observer of the particular state of the dimple 18. Obviously, any pressure sensitive device may be used in place of the manometer 16 to activate any desired type of indication means. Alternately, the output of the tube 15 may be connected to any other desired load or may be used to provide an input to other fluid circuitry, as for example, fluid logic or computer circuitry.

The tube 11, the sheet 17 and the tube 13 form a unitary device wherein the tube 11, the sheet 17 and the tube 13 are rigidly fixed in position one to the other by any convenient means, for example, as by embedding in plastic which would be vented to permit escape of excess fluid therefrom.

Figure 3:
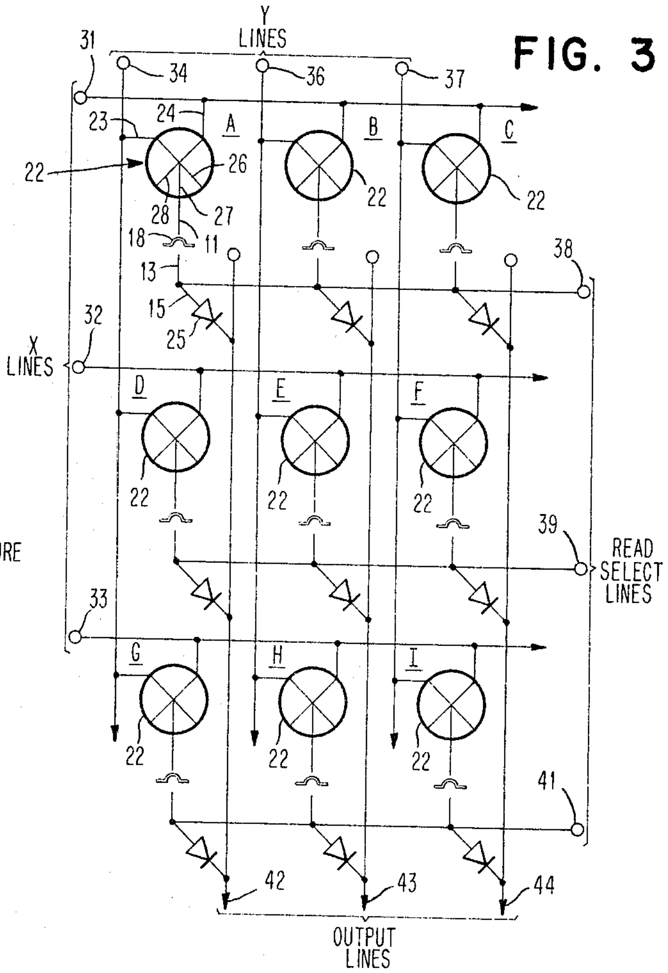
FIGURE 3 illustrates in schematic detail a preferred embodiment of a portion of a fluid memory matrix of the present invention.

FIGURE 2 illustrates the sheet 17 in a form to permit use with the memory matrix shown in FIGURE 3 which will be more fully described hereinbelow. The sheet 17 is made of a very thin metal or plastic having pressed therein a plurality of tiny dimples 18 in rectangular array. The dimples 18 may be placed on quarter inch centers such that a sheet 10 inches by 10 inches would contain 1600 bits. The sheet 17 may be made of a material having very high square loop characteristics such that the dimples 18 will not deflect or snap out until the applied fluid pressure exceeds a predetermined amount. Thereafter, the dimples 18 will remain in their last position without the continuous application of the driving force.

As shown in FIGURE 2, some of the dimples 18 are in the "0" state while others are in the "1" state. The particular manner in which the dimples 18 are set to the "1" state, reset to the "0" state, and read-out may be understood by reference to FIGURE 3, which shows a fluid memory matrix 21 using a plurality of the fluid memory elements of FIGURE 1 arranged in a matrix.

The fluid memory matrix 21 comprises an array of memory cells A, B, C, D, E, F, G, H and I arranged in rows and columns of threes. In actual practice the matrix might comprise any desired number of memory cells. Each of the memory cells A through I are identical in structure and function. Therefore, only one memory cell, i.e., memory cell A, will be described in detail.

The memory cell A comprises an AND gate 22 of the momentum type, i.e., one which gives no output when only one input is present and which gives full output when both inputs are present, as well known in the art. The AND gate 22 comprises input channels 23 and 24 and output channels 26, 27 and 28. When each of the channels 23 and 24 has an input, the output channel 27 provides an output. However, when only one of the channels 23 or 24 has an input, the input will exhaust through the output channels 26 or 28, respectively. The tube 11, which corresponds to the tube 11 as described with reference to FIGURE 1, is connected to the output channel 27 of the AND gate 22. The tube 13 corresponds to the tube 13 that is described with reference to FIGURE 1. The sheet of plastic 17 having the dimple 18 is disposed between the tubes 11 and 13 as discussed with reference to FIGURE 1. However, in the memory matrix 21 a sheet of plastic having rectangular arrays of dimples formed therein as shown in FIGURE 2 is used.

Each of the input channels of the memory cells A, B, and C corresponding to the input channel 24 of the AND gate 22 are connected to X driver line 31. Similarly, each of the input channels of the memory cells D, E and F corresponding to the input channel 24 of the AND gate 22 are connected to X driver line 32. Likewise, each of the input channels of the memory cells G, H and I corresponding to the input channel 24 of the AND gate 22 are connected to X driver line 33.

In similar fashion each of the input channels of the memory cells A, D and G corresponding to the input channel 23 of the AND gate 22 are connected to Y driver line 34. The corresponding input channels of memory cells B, E and H are connected to Y driver line 36 and the corresponding input channel of the memory cells C, F and I are connected to Y driver line 37.

The memory matrix 21 is word organized. In other words, the horizontal rows of the memory cells correspond to one word of the memory while the vertical columns of the memory cells correspond to the individual bits of the word. To aid in the explanation of the manner in which words are written into the memory matrix 21 first assume that all the dimples 18 of each of the memory cells A through I are in the "0" state, i.e., as shown. When the pressure in X driver line 31 is high, any combination of positive pressure pulses on the Y driver lines 34, 36 or 37 causes an output pulse in the appropriate output channel 27 of each of the AND gates of memory cells A, B or C. For example, to write the word represented by the code 100 into the first word location the X driver line 31 would have to be high when a pulse was applied to Y driver line 34. When this condition occurred, the dimple 18 of memory cell A would be snapped out to the "1" state while the corresponding dimples in memory cells B and C would remain in the "0" state. Similarly, when the X driver line 31 has an input and Y driver line 36 is pulsed, the dimple of the memory cell B would be snapped out to the "1" state and the word represented by the code 010 would be written into the word line represented by the memory cells A, B and C. Words are written into the word lines represented by the memory cells D, E and F and G, H and I in the same manner when each of X driver lines 31, 32 and 33 have an input applied thereto, words may be written into each of the three word lines simultaneously when one or any combination of Y driver lines 34, 36 and 37 are pulsed. It should be pointed out that in actual practice words are written into only one word line at a time.

The tubes of memory cells A, B and C corresponding to the tube 13 of the memory cell A are connected to read select line 38. The tubes of memory cells D, E and F corresponding to the tube 13 of the memory cell A are connected to read select line 39. The tubes of memory cells G, H and I corresponding to the tube 13 of the memory cell A are connected read select line 41.

Each of the tubes of the memory cells A, D and G corresponding to the tube 15 of the memory cell A are connected to the output line 42. In like manner the tubes of the memory cells B, E and H corresponding to the tube 13 of the memory cell A are connected to the output line 43. Similarly, the tubes of the memory cells C, F and I corresponding to the tube 13 of the memory cell A are connected to the output line 44. The tube 13 of the memory cell A is connected to the output line 42 through fluid diode 15. As may be seen from the drawing, all of the tubes corresponding to tube 13 connect to their respective output lines through fluid diodes in an identical manner.

To read-out, the appropriate read select line 38, 39 or 41 is selected and a fluid pressure is applied thereto of insufficient pressure and velocity to cause any one of the dimples 18 which are in the "1" state to snap out to the "0" state. Thus, for example, if it is desired to read the word in the word line comprising the memory cells A, B and C, a fluid pressure is applied to the read select line 38. Assuming that the dimple 18 of the memory cell A is in the "1" state, i.e., opposite from that shown and the corresponding dimples of the memory cells B and C are in the "0" state, the dimple 18 of the memory cell A will effectively block the outlet of the tube 13. This causes the pressure to back up and be emitted through fluid diode 15 at output line 42. At the same time the corresponding dimples 18 of memory cells B and C which are in the zero state are ineffective to block the tubes of memory cells B and C corresponding to the tube 13 of the memory cell A and the output lines 43 and 44 remain low in output pressure. The pressures at the output lines 42, 43 and 44 then represent the word in word line represented by the memory cells A, B and C. Similarly, a word registered in the word line composed of the memory cells D, E and F may be read-out by applying a pressure on the read select line 39. In like manner any word in the word line comprising the memory cells G, H and I can be read out by applying a pressure to the read select line 41.

The memory matrix 21 may be reset in preparation for writing a new word by applying a pressure on the read select lines 38, 39 and 41 of sufficient magnitude to cause any of the dimples 18 which happened to be in the "1" state to snap out to the "0" state.

The manner in which words are placed in the memory matrix 21 is, as aforesaid, through the X and Y driver lines. If the memory matrix 21 forms part of a computer system, the arithmetic portion of the system might contain the word or words to be placed in the memory matrix 21 and would provide the inputs to Y driver lines 34, 36 and 37 such that the pressure on the Y driver lines 34, 36 and 37 would be a combination of high or low in accordance with the particular word. The particular location in the memory matrix in which a word is to be written would be selected by the control logic portion of the system which would drive the appropriate X driver line 31, 32 or 33.

However, it is pointed out that the present invention is in the fluid memory and does not necessarily involve any specific computer structure such as an arithmetic register or control logic system.

It is important to note that the memory matrix 21 may be built without employing AND gates 22. For example, input channels 23 and 24 could be so positioned relative to each other and the dimple 18 such that when pressure was coincidentally present in them, the dimple would change state. In this case the outputs from channels 23 and 24 would merge to form one output of sufficient magnitude to switch the dimple. This, of course, is still the AND function and the output channels 23 and 24 in their relative positions could be called an AND gate.

The embodiments of the invention in which an exclusive property or privilege is claimed are defined as follows:

1. In a fluid memory, a thin sheet of plastic having at least one dimple formed therein, said dimple being capable of being flexed from a first stable state to a second stable state by a predetermined force, a tube having at one end an orifice adjacent said dimple and substantially closed by said dimple when said dimple is in said second stable state, a source of fluid connected to the other end of said tube, pressure sensitive means connected to said tube detecting any increase of pressure in said tube when said dimple is in said second stable state and said source of fluid is providing fluid at a pressure force less than said predetermined force.

2 In a fluid memory, a thin sheet of plastic having at least one dimple formed therein, said dimple having first and second stable means, first fluid means disposed adjacent said dimple for providing fluid pressure to change the position of said dimple from said first to said second position, a channel having an open end disposed adjacent said dimple such that said open end is substantially closed when said dimple is in said second position, a source of fluid connected to said channel causing said dimple to change from said second to said first position when said source of fluid provides fluid at a first pressure, means connected to said channel detecting the increase of pressure therein when said dimple is in said second position and said source of fluid provides fluid at a second pressure.

3. A fluid memory device, comprising in combination: a thin sheet of flexible material having a dimple formed therein, said dimple having a first position whereby it forms a concave surface with one surface of said thin sheet and a second position whereby it forms a convex surface with said one surface of said thin sheet, said dimple being capable of being snapped from said first to said second or from said second to said first positions by a predetermined force, first tube means having an orifice disposed adjacent said dimple for providing a fluid stream at said predetermined force for snapping said dimple from said first to said second position, second tube means having an orifice disposed adjacent said dimple, said orifice of said second tube means being substantially closed when said dimple is in said second portion, source means connected to said second tube means for providing a fluid stream at said predetermined force for snapping said dimple from said second to said first position, pressure sensitive means connected to said second tube means for sensing the increase in pressure in said second tube when said source provides fluid at a pressure below said predetermined force.

4. In a fluid memory matrix, a plurality of memory cells arranged in rows and columns, each of said memory cells comprising a fluid AND gate having first and second input channels and an output channel, memory element means, first fluid means connected to said output channel for changing the memory state of said memory element means when said output channel has an output, second fluid means for sensing the memory state of said memory element means, a first channel means associated with each of said rows connected in common to said first input channels of each of said AND gates in a row, a second channel means associated with each of said columns connected in common to said second input channels of each of said AND gates in a column, whereby any desired one or ones of said output channels of said AND gates may have an output by applying inputs to a predetermined combination of said first and second channel means.

5. In a fluid memory matrix according to claim 4 wherein said memory element means comprises: a thin sheet of flexible material having a dimple formed therein, said dimple being capable of being flexed from a first stable position to a second stable position by a predetermined force when said output channel of said AND gate provides said first fluid means with a fluid pressure of said predetermined force.

6. In a fluid memory matrix, comprising in combination: a plurality of fluid memory cells, each of said memory cells comprising a fluid AND gate having first and second input channels and an output channel, each of said output channels of each of said AND gates having an output only when a fluid pressure is applied simultaneously to said first and second input channels of the associated AND gate, each of said memory cells having a memory element which assumes a first stable state when and after the associated AND gate has an output and which remains in a second stable state when the associated AND gate has no output, means included in each of said memory cells sensing the particular memory state of the associated memory element.

7. In a fluid memory matrix according to claim 6 wherein each of said memory elements comprise: a thin sheet of flexible material having a dimple formed therein, said dimple being capable of being flexed from a first stable position to a second stable position by a predetermined force, tube means having an orifice disposed adjacent said dimple, said tube means being connected to said output channel of the associated AND gate whereby when said output channel has an output of fluid pressure at said predetermined force said dimple is flexed from said first to said second position.

8. A fluid memory matrix, comprising in combination: a plurality of memory cells arranged in rows and columns, each of said memory cells comprising a fluid AND gate having first and second input channels and an output channel, memory element means comprising a thin sheet of flexible material having a dimple formed therein, said dimple having a first stable position whereby it forms a concave surface with one surface of said thin sheet and a second stable position whereby it forms a convex surface with said one surface of said thin sheet, said dimple being capable of being snapped from said first to said second or from said second to said first positions by a predetermined force, first tube means connected to said output channel of said AND gate and having an orifice adjacent said dimple for providing a fluid stream at said predetermined force for snapping said dimple from said first to said second position, sensing means for sensing the position of said dimple, first channel means associated with each of said rows connected in common to said first input channels of each of said AND gates in a row, second channel means associated with each of said columns connected in common to said second input channels of each of said AND gates in a column, whereby any desired one or ones of said output channels of said AND gates may have an output by applying inputs to a predetermined combination of said first and second channel means.

9. A fluid memory matrix according to claim 8 wherein each of said sensing means further comprises, a tube having at one end an orifice adjacent said dimple, each of said tubes in a row being connected in common to an input channel, each of said tubes in a column being connected in common to an output channel through a fluid diode, whereby when fluid pressure below said predetermined force is applied to selected ones of said input channels the associated output channel will provide a low output when the associated dimple is in said first position or a high output when the associated dimple is in said second positon and when said fluid pressure is above said predetermined force all the dimples in the associated row in said second position will be snapped to said first position.

References Cited by the Examiner

UNITED STATES PATENTS

| | | | |
|---|---|---|---|
| 2,453,239 | 11/1948 | Luhn | 235—61.117 X |
| 2,658,972 | 11/1953 | Brown | 200—87 |
| 3,057,375 | 10/1962 | Etter | 235—201 X |
| 3,091,876 | 6/1963 | Cole | 40—28 |

FOREIGN PATENTS

| | | |
|---|---|---|
| 111,405 | 7/1964 | Czechoslovakia. |
| 1,362,309 | 4/1964 | France. |
| 1,143,352 | 2/1963 | Germany. |

OTHER REFERENCES

Truslove, "Hydraulic Memory Device," IBM Technical Disclosure Bulletin, vol. 6, No. 3, August 1963. Pp. 32–33.

RICHARD B. WILKINSON, *Primary Examiner.*

LEO SMILOW, *Examiner*

W. F. BAUER, *Assistant Examiner.*